(12) United States Patent
Hampel et al.

(10) Patent No.: US 8,948,450 B2
(45) Date of Patent: Feb. 3, 2015

(54) METHOD AND SYSTEM FOR AUTOMATIC OBJECT DETECTION AND SUBSEQUENT OBJECT TRACKING IN ACCORDANCE WITH THE OBJECT SHAPE

(75) Inventors: Hermann Hampel, Grosshabersdorf (DE); Ulrich Berold, Nuremberg (DE); Katharina Quast, Erlangen (DE); Andre Kaup, Effeltrich (DE)

(73) Assignee: iAd Gesellschaft für Informatik, Automatisierung und Datenverarbeitung mbH, Großhabersdorf (DE)

( * ) Notice: Subject to any disclaimer, the term of this patent is extended or adjusted under 35 U.S.C. 154(b) by 171 days.

(21) Appl. No.: 13/391,790

(22) PCT Filed: Aug. 22, 2010

(86) PCT No.: PCT/EP2010/005149
§ 371 (c)(1),
(2), (4) Date: Feb. 22, 2012

(87) PCT Pub. No.: WO2011/023348
PCT Pub. Date: Mar. 3, 2011

(65) Prior Publication Data
US 2012/0148103 A1 Jun. 14, 2012

(30) Foreign Application Priority Data
Aug. 23, 2009 (DE) .......... 10 2009 038 364

(51) Int. Cl.
*G06K 9/00* (2006.01)
*G06T 7/20* (2006.01)

(52) U.S. Cl.
CPC ............ *G06T 7/208* (2013.01); *G06K 9/00771* (2013.01); *G06T 7/2053* (2013.01); *G06T 2207/10016* (2013.01); *G06T 2207/30232* (2013.01)
USPC ....................................... 382/103

(58) Field of Classification Search
USPC ......... 382/103, 104, 164, 165, 173, 203, 204, 382/224, 260, 261, 267; 348/113, 169
See application file for complete search history.

(56) References Cited

U.S. PATENT DOCUMENTS

| | | | |
|---|---|---|---|
| 6,590,999 B1 | 7/2003 | Comaniciu et al. | |
| 2006/0222205 A1* | 10/2006 | Porikli et al. | ........... 382/103 |

(Continued)

OTHER PUBLICATIONS

Yi et al ("Orientation and Scale Invariant Mean Shift Using Object Mask-Based Kernel", EECS Department, Automation and System Research Institute (ASRI) Seoul National University, Seoul Korea, 2008).*

(Continued)

*Primary Examiner* — Shervin Nakhjavan
(74) *Attorney, Agent, or Firm* — Rankin, Hill & Clark LLP

(57) ABSTRACT

A method and system for automatic object detection and subsequent object tracking in accordance with the object shape in digital video systems having at least one camera for recording and transmitting video sequences. In accordance with the method and system, an object detection algorithm based on a Gaussian mixture model and expanded object tracking based on Mean-Shift are combined with each other in object detection. The object detection is expanded in accordance with a model of the background by improved removal of shadows, the binary mask generated in this way is used to create an asymmetric filter core, and then the actual algorithm for the shape-adaptive object tracking, expanded by a segmentation step for adapting the shape, is initialized, and therefore a determination at least of the object shape or object contour or the orientation of the object in space is made possible.

12 Claims, 8 Drawing Sheets
(1 of 8 Drawing Sheet(s) Filed in Color)

(56) References Cited

U.S. PATENT DOCUMENTS

2007/0189627 A1* 8/2007 Cohen et al. .................. 382/254
2010/0166260 A1* 7/2010 Huang et al. .................. 382/103

OTHER PUBLICATIONS

Yin et al ("Object Tracking and Detection after Occlusion via Numerical Hybrid Local and Global Mode-seeking", Department of Computer Science and Engineering, The Pennsylvania State University, University Park, PA 16802, 2008).*

Yilmaz ("Object Tracking by Asymmetric Kernel Mean Shift with Automatic Scale and Orientation Selection", Ohio State University Photogrammetric Computer Vision Laboratory, 2007).*

Lao et al; "Automatic Video-Based Human Motion Analyzer for Consumer Surveillance System"; IEEE Transactions on Consumer Electronics, IEEE Service Center, New York, NY; vol. 52, No. 2; May 1, 2009; pp. 591-598; XP011270911.

Chen et al: "An Improved Mean Sshift Algorithm for Moving Object Tracking"; Intelligent Control and Automation; 2008; WCICA 2008; 7th World Congress on, IEEE; Piscataway, NJ; Jun. 25, 2008; Pagtes 5111-5114; XP031301725.

Wang et al.; "Face Obscuration in a Video Sequence by Integrating Kernel-Based Mean-Shift and Active Contour"; Control, Automation, Robotics and Vision, 2008; ICARCV 2008; 10th International Conference on, IEEE, Piscataway, NJ; Dec. 17, 2008; pp. 2314-2318; XP031433962.

* cited by examiner

METHOD AND SYSTEM FOR AUTOMATIC OBJECT DETECTION AND SUBSEQUENT OBJECT TRACKING IN ACCORDANCE WITH THE OBJECT SHAPE

BACKGROUND OF THE INVENTION (1) Field of the Invention

The invention relates to a method for automatic object detection and subsequent object tracking in accordance with the object's shape. The invention also relates to a system therefor.

(2) Description of Related Art

The automatic detection and tracking of moving objects is not only of central importance in video surveillance, but also in many other areas of video technology and image processing. A large number of so-called object tracking methods exist, but usually these are limited to the determination of the object's actual position. For many applications, in addition to the current position of the object, the shape and orientation of the object is also an area of interest.

There exists a variety of tracking methods for object tracking. Among the best known and widely used methods are Kalman filter tracking, Mean-shift tracking and particle filter tracking, as well their extensions and variations. For example, U.S. Pat. No. 6,590,999 B1 describes a method and an apparatus for object tracking in accordance with Mean-Shift Tracking, namely a Mean Shift tracking in real time for an object target variable in the shape, such as humans. The object tracking is based on visually recognizable features, for example color or structures, wherein the statistical distribution of these features characterizes the target. In a first step, the degree of similarity between a predetermined target and a comparison target is calculated, and in a subsequent step, the degree is calculated by itself, and expressed by a metric, which is derived from the Bhattacharyya coefficient. A gradient vector derived from the maximum value of the Bhattacharyya coefficient is then used for determining the most probable location of the target in the following sections.

All the traditional methods can identify the position of an object reasonably robustly, and may be able to partially also determine the size of the object. A determination of the actual object shape and orientation of the object is not, however, possible using the traditional methods.

A tracking of the shape of the object is possible only by extensions and improvements of the original procedures. Above all, the particle Filter and the mean-shift methods discussed above have been developed further in this direction.

In the conference paper "Particle filtering for geometric active contours with application to tracking moving and deforming objects" by Rathi, Y. and Vaswani, N. and Tannenbaum, A. and Yezzi, A. IEEE Computer Society Conference on Computer Vision and Pattern Recognition, 2, 2005, such a particle filter version is described. Although the shape of the object can be tracked quite well, this approach has some drawbacks.

For example, some information on the object form is provided to the algorithm such that by greater occlusion of the object, the objects' shape can to be described. This in turn leads to the fact that by very large deformations, the shape cannot be tracked very accurately.

The performance of the method is also extremely reduced in the event that the object is completely hidden for a long time.

A further development of the mean-shift procedure for tracking the shape of the object was presented in the conference paper "Object Tracking by asymmetry kernel Mean Shift with Automatic Scale and Orientation Selection" by A. Yilmaz, in Proc. IEEE Conference on Computer Vision and Pattern Recognition, June 2007, pp. 1-6. Instead of a symmetric filter kernel, a level-set functions of certain filter core is used, which is adapted to the shape of the object. Furthermore, the search space is expanded by a scaling- and orientation dimension. Thus, in addition to the object position, also the size and the orientation of the object or its contour can be determined. However, since the orientation of the object is only calculated within a 2D image plane, the object shape cannot be adapted to the actual movement of the object in three dimensional spaces.

Another tracking algorithm, which cannot be assigned to one of these three basic methods discussed above, is based on the so-called machine learning approach. In this approach, both Hidden Marko Models and geometric object features can be considered to calculate the object's shape. Since the method determines the contour points of the object by a classification, the method must first be trained using a training set of the classifier (certain characteristics). Thus, of course, a training set must be present or generated. Because each pixel must be considered in the classification, a particularly large amount of features and thus a relatively large training set is required.

In general, also typically for most tracking methods is that they cannot detect objects to be tracked automatically. Many tracking algorithms are therefore either dependent on user inputs or results from a previously performed object recognition. In general, a system for object tracking comprises therefore a component for object recognition and the actual tracking algorithm.

In FIG. 9 the schematic procedure of an automated object tracking of such a system according to the prior art is shown consisting of an object recognition based on the Gaussian Mixture Models and the mean-shift tracking.

Adaptive Gaussian Mixture Models are a widely used background subtraction. As proposed in C. Stauffer and W. E. L. Grimson, "Adaptive background mixture models for real-time tracking," in Proc. IEEE Computer Society Conference on Computer Vision and Pattern Recognition, vol. 2, 1999, each pixel of a scene can be modeled by a mixture consisting of K different Gaussian functions. The modeling is based on the estimate of the probability density of the color values of each pixel. It is believed that the color of a pixel value is determined by the surface of the object that is imaged on the pixel under consideration. In the case of an ideal and static scene without noise, the probability density of a color value of a pixel can be described by a Dirac-Impulse-Function. Due to camera noise and light illumination changes, however, in a real static scene, the color value of a pixel changes over time.

In non-stationary scenes can also be observed that up to K different objects k=1 ... K can be mapped to a pixel. Therefore, for monochromatic video sequences, the probability density of a pixel color value X, caused by an object k, can be modeled by the following Gaussian function with mean $\mu_k$ and standard deviation $\sigma_k$:

$$\eta(X, \mu_k, \sigma_k) = \frac{1}{\sqrt{2\pi}\,\sigma_k} e^{-\frac{1}{2}\left(\frac{X-\mu_k}{\sigma_k}\right)^2} \quad (1)$$

$$\eta(X, \mu_k, \Sigma_k) = \frac{1}{(2\pi)^{\frac{n}{2}}|\Sigma_k|^{\frac{1}{2}}} e^{-\frac{1}{2}(X-\mu_k)\Sigma_k^{-1}(X-\mu_k)} \quad (2)$$

where $\Sigma$ denotes an n by n large covariance matrix of the form $\Sigma_k = \sigma_k^2 I$, since it is assumed that the RGB color channels are independently and possess the same standard deviation. This assumption does not correspond with the facts, but avoids a very computationally intensive matrix inversion. The probability that a pixel x in the image t has the color value X corresponds to the weighted mixture of the probability density functions of the k=1 . . . K objects that can be mapped at the pixel:

$$P(X_t) = \sum_{k=1}^{K} \omega_{k,t} \cdot \eta(X_t, \mu_{k,t}, \Sigma_{k,t}) \quad (3)$$

with weighting factor $\omega_k$. In practice K is often restricted to the values 3 to 5.

The GMM algorithm can now be divided into two steps. First, for each new image of the video sequence, the existing model must be updated. Using the model, then an actual picture of the background is formed; subsequently the current image can be divided into front and background. For updating the model is verified whether the current color value of one of the existing K Gaussian functions can be assigned.

A pixel is assigned a Gaussian function k, if:

$$\|X_t - \mu_{k,t-1}\| < d \cdot \sigma_{k,t-1} \quad (4)$$

where d denotes a user-defined parameters. This means that all color values that differ less than $d \cdot \sigma_{k,t-1}$ from the mean, are assigned to the k-ten Gaussian function. On the other hand, the condition can also be interpreted to mean that all color values are assigned to the Gaussian function, which lies within the area corresponding to the probability $p_0$:

$$\int_{\mu_{k,t-1}-d \cdot \sigma_{k,t-1}}^{\mu_{k,t-1}-d \cdot \sigma_{k,t-1}} \eta(X_t, \mu_{k,t-1}, \Sigma_{k,t-1}) dX_t = p_0 \quad (5)$$

If X can be assigned to a distribution the model parameters are adjusted as follows:

$$\omega_{k,t} = (1-\alpha)\omega_{k,t-1} + \alpha \quad (6)$$

$$\mu_{k,t} = (1-\rho_{k,t})\mu_{k,t-1} + \rho_{k,t}X_t \quad (7)$$

$$\sigma_{k,t} = \sqrt{(1-\rho_{k,t})\sigma_{k,t-1}^2 + \rho_{k,t}(\|X_t-\mu_{k,t}\|)^2} \quad (8)$$

where $\rho_{k,t} = \alpha/\omega_{k,t}$ after P. W. Power and J A Schoonees, "Understanding background mixture models for foreground segmentation," in Proc. Image and Vision Computing, 2002, p. 267-271. For the other distributions, where X cannot be assigned, only the value for $\omega_{k,t}$ according to Eq. (9) is calculated:

$$\omega_{k,t} = (1-\alpha)\omega_{k,t-1} \quad (9)$$

While the other parameters remain unchanged.

The Gaussian functions are sorted according to a confidence measure $\omega_{k,t}/\sigma_{k,t}$ so that with increasing index k the reliability decreases. Where more than one pixel is assigned a Gaussian distribution, it is allocated to those with the highest reliability. If the condition in Eq. (4) does not apply, and a color value of none of the Gaussian distributions can be assigned, the least reliable Gaussian function is replaced by a new Gaussian distribution with the current image point as an average. This new Gaussian function is initialized with a small probability of occurrence and a large standard deviation. Subsequently, all $\omega_{k,t}$ are scaled. A color value is considered more likely (lower k) with higher probability as background if it shows up frequently ($\omega_k$)) and will not change much ($\omega_k$). In order to determine the B distributions to model the background, a user-defined prior probability T is used as a threshold:

$$B = \mathrm{argmin}_b \left( \sum_{k=1}^{b} w_k > T \right) \quad (10)$$

The remaining K-B distributions are to the foreground.

The GMM algorithm for object detection (see 1) initially forms a model of the current background. By subtraction (see 2) of the current background model from the current frame, changing image regions are detected. Then from the difference between the background and the current image by thresholding (see 3) a binary mask BM is determined, which contains the moving image regions. By simple morphological operations (see 4) small deviations, often caused by noise and false detections, should be removed from the binary mask BM, and thus the binary mask BM is so refined. To determine contiguous object regions, the binary mask is subsequently subjected to a so-called Connected Component Analysis (see 5).

When recognized areas appear in successive images, the object is considered to be reliable detected (see 6). Through a simple comparison of detected objects and objects that have already been pursued, newly identified objects can be determined (7 and 7a: no new object tracking).

If a new object is detected, a bounding box in the shape of a simple rectangle is determined by the object. Within the bounding box again an ellipse is defined (see 8), whose size defines the size of the bounding box. Subsequently, on the basis of the pixels located within the ellipse, a histogram of the typical object characteristics (such as color) is formed. For histogram formation (see 9), an Epanechnikov-filter kernel is used, which makes the features of pixels at the edge of the ellipse lighter weight. Thus, the influence of background pixels that can appear on the edge of the ellipse will be reduced in the histogram.

The weighted histogram of the object is known as a so-called target model, as it is the target of mean-shift tracking (see 10) to find a near similar histogram or model of the object in the next picture. This target model is now used for initializing the traditional mean-shift tracking, and starts tracking the object by object position OP and video signal at the output of the camera VS K in the control room KR.

A method and a device and a computer program for detecting and/or tracking of moving objects in a surveillance scene where, besides the moving objects, interfering objects and/or disturbance areas may occur, is known from DE 10 2007 041 893 A1 for video surveillance systems. CCTV systems typically comprise a plurality of surveillance cameras and are used to monitor public or commercial areas. In accordance with the subject matter disclosed in DE 10 2007 041 893 A1, this is done by an image-based method for detecting and/or tracking of moving objects in a surveillance scene which is preferably implemented by means of digital image processing. In this connection, the detection comprises the initial recognition of the moving objects and tracking the recognition of the moving objects in subsequent images of the surveillance scene. The method is adapted to one or more moving objects to detect or pursue. For this purpose, in the surveillance scene several regions defined which can have any desired shape, for example round, rectangular or square, and may be also be arranged without overlap or to overlap. Regions are defined as image details of the monitoring scene, which are positioned over a monitoring period, are preferably stationary. The regions are divided into different class-sensitive regions, including a first region in which no interferers and/or neglected or be neglected interferers are arranged and/or to be expected. The division in the region classes, for example, can be carried out manually by a user and/or automatically by a first, for example, image-based content analysis of the monitoring scene. In the sensitive regions, a sensitive content analysis, in particular video content analysis, for detecting and/or tracking of moving objects is carried out. The sensitive content analysis includes, for example, the steps of formation or acquisition of a scene reference image, segmentation of objects, detection and/or prosecution of the segmented objects over time. It is also proposed to use a second region, whereas the semi-sensitive regions are classified are sheet and/or to be classified reproducibly, and whereas in the semi-sensitive regions in particular stationary and/or permanent disturbers are arranged and/or to be expected. For the detection and/or tracking of moving objects in the semi-sensitive regions a half-sensitive content analysis is performed, which in view of the used image processing algorithms is restricted and/or modified with respect to the sensitive content analysis. It is also proposed to supplement and/or replace insensitive regions by semi-sensitive regions, whereas in the semi-sensitive regions at least a limited content analysis of the surveillance scene is being carried out. First, it is possible, to implement this limited content analysis through the use of simplified image processing algorithms and on the other hand, it is possible to obtain information of moving objects, which were developed in the sensitive regions to use in the semi-sensitive regions further and thus the detection and/or to support tracking of moving objects in the semi-sensitive regions by means of information transfer. While remaining in video surveillance by this method furthermore still difficult detecting areas, but however, regions which are formed as blind spots are excluded or at least minimized. In a preferred embodiment of the invention, regions can be optionally divided into a third region class, which includes insensitive regions where such for example interferers are located, whereas no analyzes of content for detection and/or tracking of moving objects is being carried out in this insensitive regions. In this preferred embodiment of the invention, therefore, the several regions of the surveillance scene are divided in exactly three region classes, namely, sensitive, semi-sensitive and insensitive regions. In an extended embodiment of the invention, a plurality of semi-sensitive region classes are provided, wherein the different semi-sensitive region classes differs by the type of content analysis. In order to implement moving objects are detected and/or prosecuted wherein an unusual patterns of movement for a half sensitive region is determined. An example of an unusual pattern of movement occurs if an object in the semi-sensitive region moves against a general direction of movement in this semi-sensitive region. This occurs in practice, for example if a person or a vehicle moves against a general moving or driving direction. Another example of an unusual pattern of movement occurs if an object moves in the semi-sensitive region having a directional motion, whereas in this semi-sensitive region otherwise only undirected movements are detected. Preferably, the movement patterns are detected through the analysis of the optical flow (optical flow) in the semi-sensitive regions. The optical flow designated a vector field that specifies the 2D movement direction and –speed of image points and Pixels or areas of an image sequence. The device according to DE 10 2007 041 893 A1 comprises a classification module, which is designed to define regions in the scene monitoring and to divide the regions in different region classes. A first class region relates to sensitive areas where no interferers and/or negligible interferers are arranged and/or are to be expected and a second class relates to semi-sensitive region regions where interferers arranged and/or to be expected. The device comprises at least a first and a second analysis module, wherein the first analysis module is adapted for detecting and/or tracking of moving objects in the sensitive regions and to carry out sensitive content analysis and the second analyzing module is configured to carry out in the semi-sensitive regions a semi-sensitive content analysis, which is limited and/or modified compared to the sensitive content analysis. The content analysis is particularly useful as video content analysis (VGA Video Content Analysis) and is preferably via digital image processing.

Furthermore, from DE 10 2008 006 709 A1 a video-based surveillance, in particular for the detection of a stationary object in a video-based surveillance system is known, whereas for the improved detection of stationary objects, the monitoring system, comprises An image sensing module for detecting a video recording has an interesting image area;

A motion detection module that is adapted to recognize the presence of a moving object in the relevant image portion of the recorded video recording, and a standstill detection module that is adapted to recognize the presence of a stationary object in the relevant image region, and which is active if the motion detection module is not recognizing a moving object in the relevant image area of a current video image of the detected video recording, whereas said standstill detection module further comprises A pixel comparison module that is adapted to compare the pixel value of a pixel in the relevant image area in the current video image with the pixel value of a corresponding pixel in an immediately preceding video image as to determine the number of pixels in the relevant image portion of the current video image whose pixel values are identically with those of the corresponding pixel in the immediately preceding match video image;

A background identification module for identification of the background, which is adapted to identify the pixels in the relevant image region in the current video image that are part of a background and are based on a comparison of their pixel values with a background pixel value; and A signal generating means for generating an output signal to indicate the detection of a stationary object, if the number of matches between the current video image and the immediately preceding video image pass over a threshold, since those pixels are subtracted in the current video image which has been identified as part of the background.

In DE 10 2008 006 709 A1, the described monitoring method includes the following steps:

Detecting a video image, this has a screen area of interest;

Determining if in the image area of interest of an actual video image a moving object, based on a background subtraction, is present and Failure to detect a moving object in the interesting image area of a current video image captured video image based said on background subtraction, performing a test to see if there is an interesting image area of a stationary object, wherein the test, comprises the following additional steps:

Comparing the pixel value of a pixel in the relevant image area in the current video image with the pixel value of a corresponding pixel in an immediately preceding video image to determine the number of pixels in the relevant image portion of the current video image whose pixel values corresponds with those of the corresponding pixel in the immediately preceding video image;

Identifying those pixels in the image region of interest in the current video image that are based on a comparison of their pixel values with a background pixel value are part of a background; and Generating an output signal to indicate the detection of a stationary object, if the number of matches between the current video image and the immediately preceding video image pass over a threshold, since those pixels are subtracted in the current video image, which were identified as part of the background.

The idea described in DE 10 2008 006 709 A1 is to provide a method by which the sustained detection of a stationary object is achieved with minimal processing power. The proposed method comes into play as soon as can be seen by the background subtraction due to the inherent limitation of the background algorithm no stationary object is detected. In one embodiment, to improve response time, the standstill detection module is only activated if the motion detection module cannot detect a moving object in an interesting image area of a current video image of the captured video recording after a moving object in the interesting image area of the immediately preceding video frame of the recorded video image has been detected.

Furthermore, the background pixel value by generating an image histogram is computed of the interesting image region containing only the background, and determines a pixel value corresponding to a mode of the histogram. This feature offers the advantage that only a single background pixel value is needed to determine whether a pixel is in the current video image is part of the background or a stationary object. Said motion detection module includes a background subtraction algorithm, based on the adaptive multiple Gaussian method. The above method of background subtraction is particularly useful for multi-modal background distributions.

Finally, from WO 2004/081875 A1, a system and a method for tracking a global form of a moving object is known, whereas one or more reference points along an initial contour of the global shape are defined, whereas each of said one or more reference points is tracked if the object is in motion and whereas the uncertainty of a location of an motion reference point is estimated. A form for the representation of uncertainty is a covariance matrix. When using a part-space form condition model, the uncertainty using a non-orthogonal projection and/or information fusion is exploited and each following contour is displayed. Wherein from WO 2004/081875 A1, which is a known system for optically tracking the movement of a shape of an object, one or more first color vectors are generated to represent contraction of reference points along the contour of the mold, there are generated one or more second reference vectors for represent dilation of reference points along the contour of the mold and for displaying the first and second color vectors periodically, thereby marking movement of the mold.

As the above appreciation of the prior art shows, a variety of tracking methods including further developments for object tracking, including the pursuit of the object shape is known. In this case, however, the orientation is calculated within the image plane and thus only 2-dimensional so that the shape of the object cannot be adapted to the actual movement of the object in three dimensional spaces.

BRIEF SUMMARY OF THE INVENTION

An object of the invention is to design a method and a system for automatic object detection and subsequent object tracking (tracking) such that it is also able next to the location and tracking of moving objects to determine the object shape and to make it possible to calculate the orientation of an object in space based on existing measurement data.

This object is solved by a method for automatic object detection and subsequent object tracking in digital video systems having at least one camera (K) for recording and transmitting video sequences, as well as further processing or evaluation of video data, wherein an object detection algorithm based on a Gaussian mixture model GMM and an expanded object tracking based on Mean-Shift are combined with each other in the object detection, whereby the object detection is increased in accordance with a model of the background by improved removal of shadows, the binary mask (BM) generated in this way is used to create an asymmetric filter core, and then the actual algorithm for the shape-adaptive object tracking, increased by a segmentation step for adapting the shape is initialized, so that a determination of at least of the object shape or the object contour or the orientation of the object in space is made possible.

Furthermore, this object is solved by a system comprising at least one camera for recording video sequences to which are connected a means for automatic object recognition and then a means for object tracking and to which means for further processing or analysis of the video signal of the camera is connected, wherein the video signal of the camera is supplied to both an object detection means based on a Gaussian Mixture Model GMM object recognition algorithm and a means having an enlarged based on Mean shift object tracking, in that the object detection means comprises means for object recognition in accordance with a model of the background enlarged by an improved shadow removal, in that the at the output arising binary mask of the object recognition means is connected to the object tracking means, which comprises means for creating an asymmetric filter core and means for the adaptive object tracking expanded to a segmentation step comprises the shape adaptation, and in that at the output arising video signal of the object tracking means is connected to the processing/evaluating means for determining the shape of the object or the object contour or the orientation of the object.

The inventive method and the system according to the invention have the advantage that moving objects are first automatically recognized by means of a GMM-based method and subsequently, using a modified mean-shift tracking, both the object position and the object contour is determined.

As a basis for the actual tracking algorithm, the mean-shift tracking was chosen because it is of low computational complexity and requires no training set. It is also based on an appropriate choice of the reference model be able to pursue an object position, even if this was completely covered. The entire method according to the invention is hereinafter referred to as a shape-adaptive object tracking.

The patent or application file contains at least one drawing executed in color. Copies of this patent or patent application publication with color drawing(s) will be provided by the Office upon request and payment of the necessary fee. Further advantages and details can be given by the following description of preferred embodiments of the invention with reference to the drawings.

DETAILED DESCRIPTION OF THE INVENTION

Figure 1:
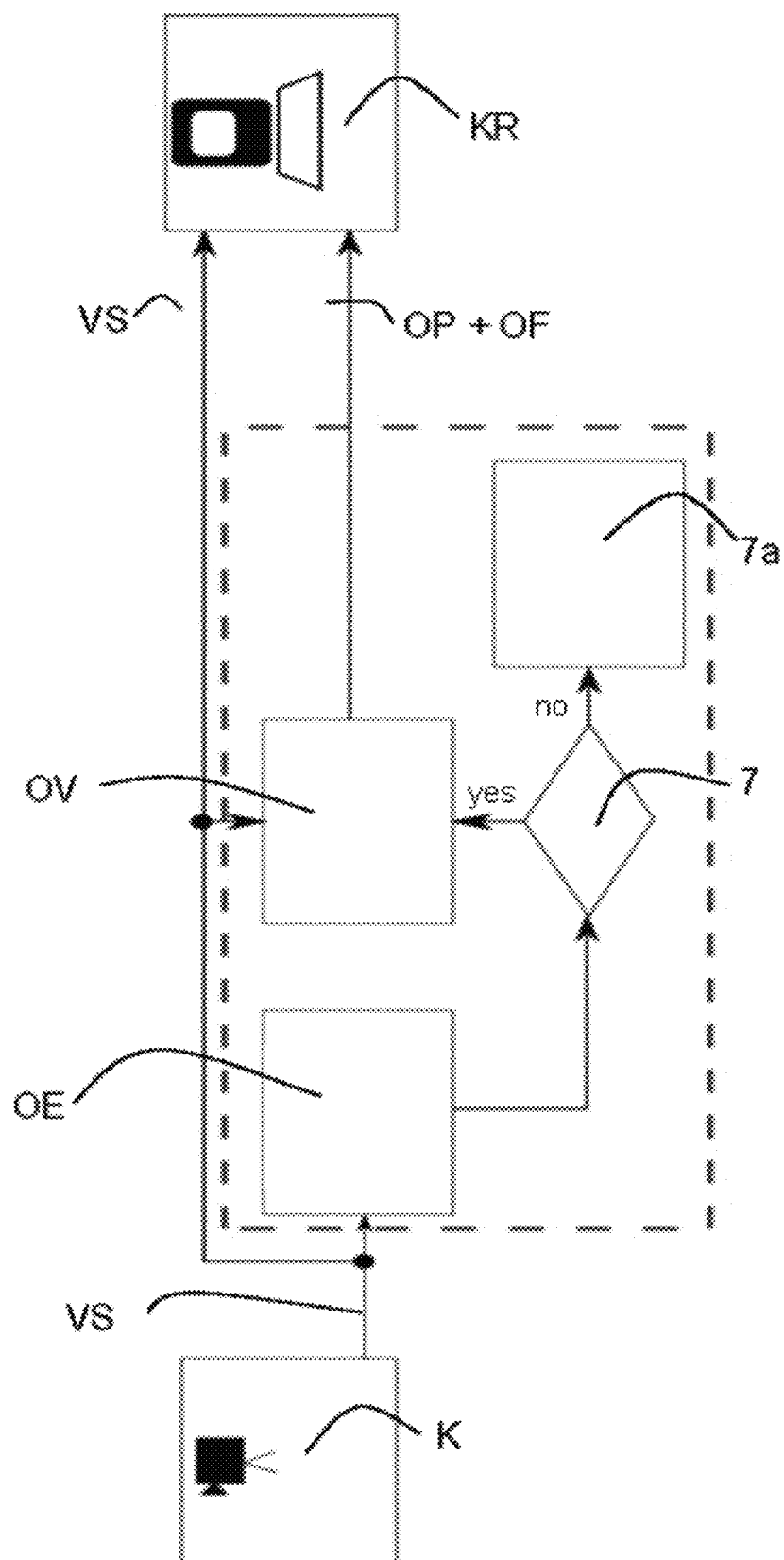
FIG. 1 a block diagram of a system architecture for video surveillance with shape adaptive object tracking, FIG. 2 a block diagram of the overall system according to FIG. 1 in detail, FIG. 3 a block diagram of the object recognition according to FIG. 1 in detail, FIG. 4 a block diagram of the object tracking according to FIG. 1 in detail, FIG. 5 the main sequence of object recognition, FIG. 6a, the detection of penumbra and umbra in two steps and FIG. 6b the detection of penumbra and umbra in one step, FIG. 7 the comparison of the results of a tracking method according to state of the art and the shape adaptive object tracking, FIG. 8 the comparison of the traditional mean-shift tracking (red) and shape adaptive object tracking (green), FIG. 9 a schematic flow of an automatically object tracking according to prior art, FIG. 10 for a video sequence: street the minimum, average and maximum standard deviation of all Gaussian distributions of all pixels, FIG. 11 a video sequence: parking lot, FIG. 12 a binary mask BM of the video sequence: parking lot of FIG. 11, which has been generated by a GMM method, which works with spatial and temporal correlation and FIG. 13 the final binary mask for the video sequence: parking lot.
Figure 2:
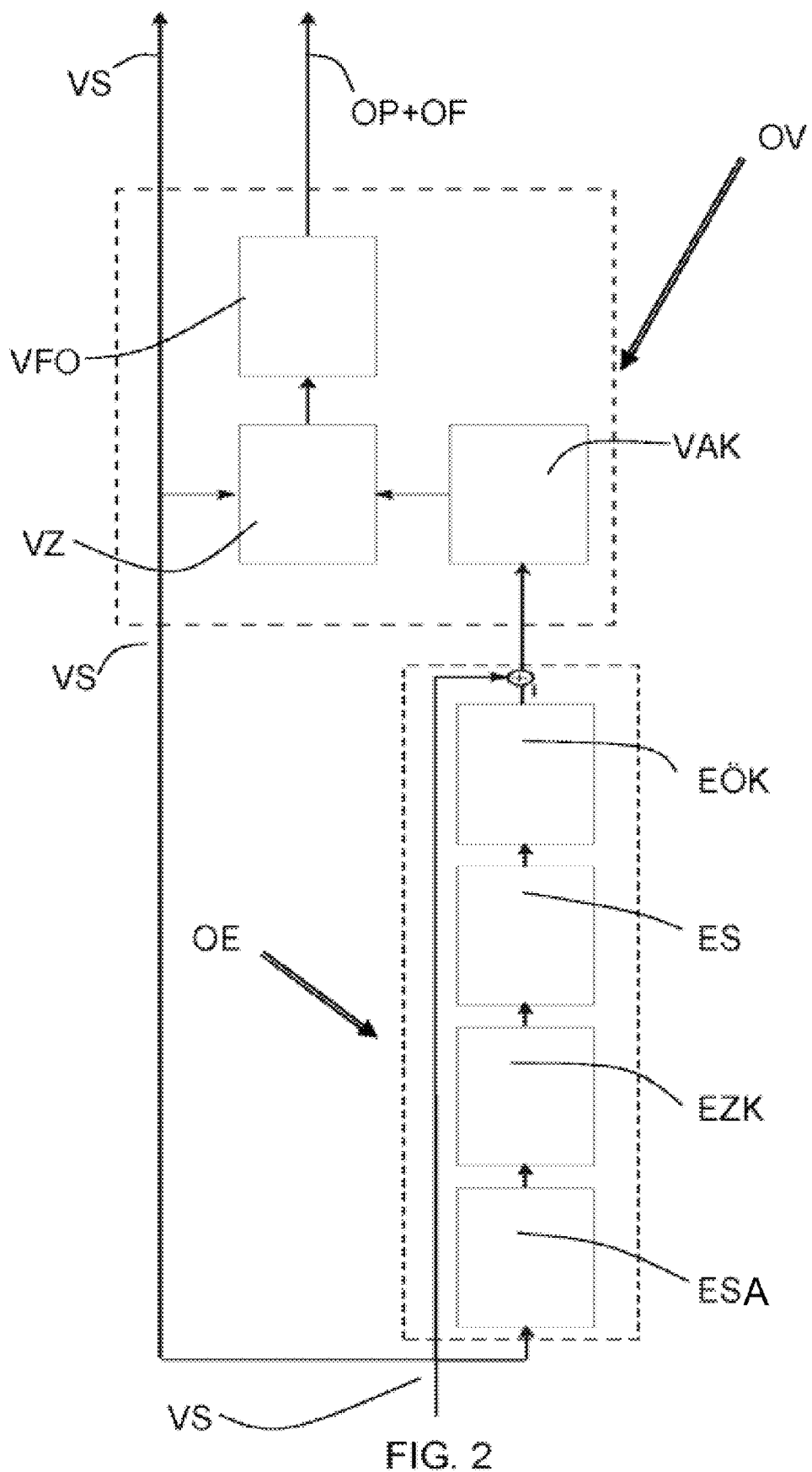

FIG. 1 and FIG. 2 provide an overview of the video surveillance system according to the invention with shape adaptive object tracking. As can be seen from the block diagram of the system architecture, the system of FIG. 1 and FIG. 2 consists substantially of an object detection module (for details, see FIG. 3) followed by an object tracking module (for details, see FIG. 4).

In particular, FIG. 1 shows a video signal VS of a camera K being supplied to both an object detection module OE, which processes the video signal using a Gaussian Mixture Model GMM based on an object recognition algorithm, as well as an object tracking module OV, which performs Mean-shift analysis based on object tracking. The object detection module OE includes means for object recognition in accordance with a model of the background enhanced by improved shadow removal (for details, see FIG. 2 and FIG. 3). At the output of the object detection module OE, there is a binary mask BM, which determines whether newly detected objects are present based upon a comparison of detected objects and objects that have previously been pursued (see 7). Newly detected objects (i.e., the "yes" response at 7 in FIG. 1) are supplied to the object tracking module OV, which comprises means to create an asymmetric filter core and means for the adaptive object tracking, which in a segmentation step are combined (7a in FIG. 1 represents the "no" response at 7—i.e., there is no new object to track). At the output of the object tracking module OV is a video signal OP+OF, which contains information about the object position OP and the object form OF, which is supplied along with the video signal VS of the camera K to a means for processing/evaluation, in particular a control room KR, to determine the shape of the object or object contour or the orientation of the object.

Figure 3:
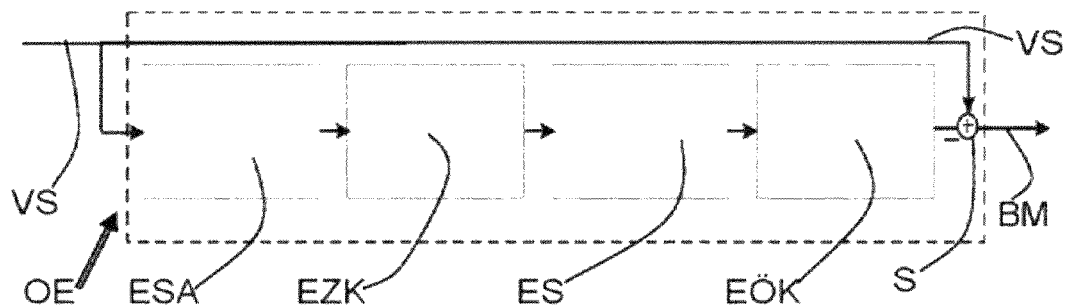

FIG. 2 and FIG. 3 show the object detection module OE in detail. This comprises in series means for limiting the standard deviation ESA, means for taking into account the temporal correlation EZK, means for shadow removal ES and means for taking into account the local correlation EÖK which is connected to an input of a subtracting circuit S. The other input of subtraction circuit S is supplied with the video signal VS of the camera K. The binary mask BM is located at the output of subtraction circuit S.

Figure 4:
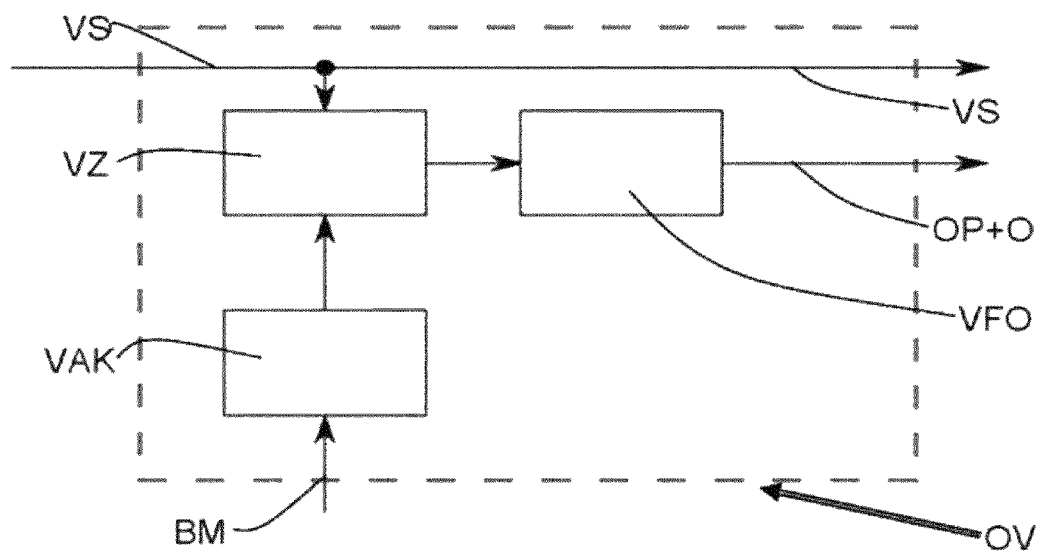

FIG. 2 and FIG. 4 show the object tracking module OV in detail. This comprises means VZ to create the histogram of the target model, a means VAK for generating the filter kernel based on the binary mask BM and a means VFO for form-adaptive object tracking. The input of the means VAK to generate the filter core is supplied the binary mask BM and the input of the means VZ for creating the target model of histogram is supplied by the video signal VS of the camera K. At the output of the means VFO for the form-adaptive object tracking, which is connected to the output of the means for creating VZ of the target model via histogram, the input video signal OP+OF is supplied to the processing/evaluating means KR.

Figure 5:
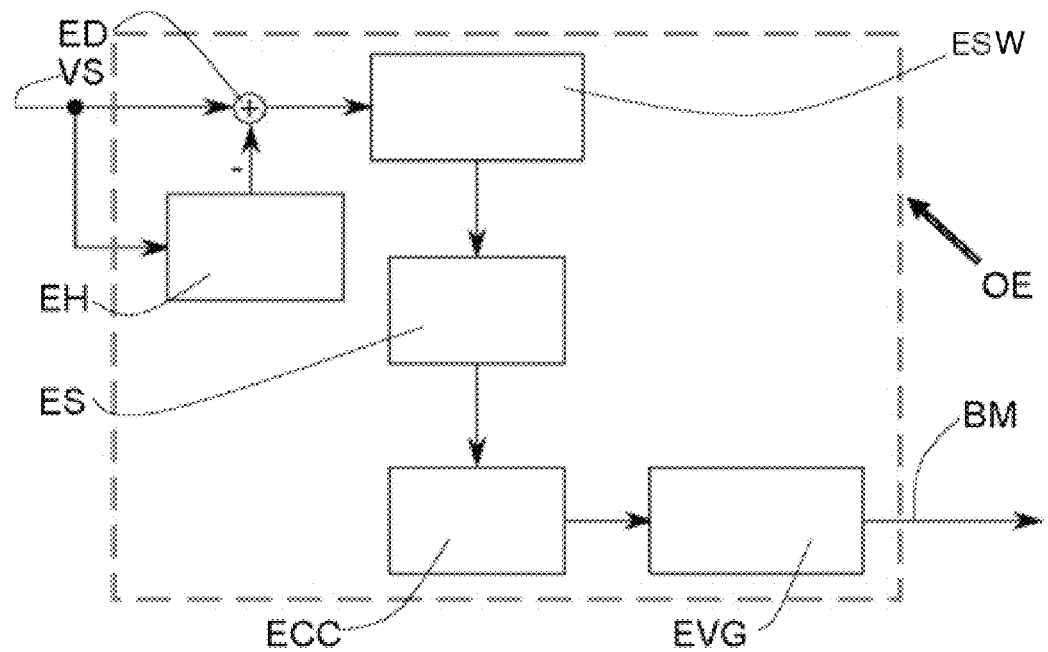

For automatic detection of moving objects or changing areas in the image—similar to the systems for object tracking according to prior art—an object recognition algorithm is used. FIG. 5 shows the essential sequence of object recognition. The video signal VS of the camera K is supplied to both a means for calculating EH of the background as well as a means ED for forming the difference of the object detection module OE. At the second input of the means ED for forming the difference the output of the means EH for calculating the background is connected. Furthermore, at the output of the means ED for forming the difference a means ESW for thresholding is connected comprising in series means ES for shadow removal, means ECC for performing a connected component analysis and means EVG for comparison of components with tracked objects. The output of the means EVG for comparison of components with tracked objects is supplied to the binary mask BM.

In the described case, the object recognition algorithm is based on the Gaussian Mixture Models GMM, via which a model of the current background image is formed. The modeling can consider various object features, in particular, color, edges and structural features or more specific information such as, preferably, the so-called SIFT features (Scale invariant feature transform). In a SIFT based background model not each pixel of a new image is examined in the sequence, but the model formation and thus also the movement detection takes place only at certain pixels, the key points. As for the calculation of SIFT features individual points are needed, instead of a commonly used edge detection, a corner detector is used. The corner function R (x, y) is determined according to the following equation (A):

$$R(x,y) = det(A(x,y)) - q \cdot spur(A(x,y))^2 \qquad (A)$$

This is det (A) the determinant of the matrix A and trace (A) the trace of the matrix A. The value for the constant q can be selected, for example, 0.06, where the function R for high values are obtained, if the matrix A has at this point two large eigenvalues. Thus, the corners in an image via a threshold decision result of the function R (x, y) can be determined. Since the absolute values of the edge function R depends on image content and contrast of the image, the threshold in relation to the maximum of edge function is specified. For the sake of practicality, a percentage from 0.00001 to 0.01 of the maximum has been found to be suitable for a threshold value. The smaller the threshold is set, the more points in the image are detected as corners. Since the complexity of the overall process depends directly on the number of key points, the method can therefore adapt to the technological possibilities, and it is important that a minimum distance is maintained between the edge points. Based on the identified key elements associated with the SIFT feature vector, a model of the background is created and adapted to each new image in the sequence. The adaptation of the model proceeds in three steps, and is determined independently for each key point. The first step is searching for model entries in a neighborhood of each corner point. For each entry found its similarity to the corresponding key point is determined. As a measure of the similarity the vector correlation C between the SIFT-feature of the corner point at the location (x, y) and the mean value characteristic of the entry at the site ($x_m$, $y_m$) is calculated using the following equation (B):

$$C(x, y, x_m, y_m) = \frac{\Phi(x, y) \circ \overline{\Phi}(x_m, y_m)}{\|\Phi(x, y)\| \|\overline{\Phi}(x_m, y_m)\|} \quad (B)$$

There o denotes the scalar product and $\|V\|$ denotes the length of the vector V. The second step is to determine whether the key point can be assigned to one of the entries. The key point is now assigned to this model entry, if according to the following equation, (C) applies:

$$C(x,y,x_m',y_m') > \mu_C(x_m',y_m') - \sigma_C(x_m',y_m') \quad (C)$$

This means that the correlation of the characteristic feature of the key points with the feature of the model entry exceeds a variable threshold. In the third step, the model is adapted. In the event that the considered corner point was associated to the model entry, then the parameters $\mu_C(x_m', y_m')$, $\sigma^2_C(x_m', y_m')$ und $\overline{\Phi}(x_m', y_m')$ and are adjusted. If, in the second step, no model entry in the environment of the examined key points could be found, a new entry at the location (x, y) is applied. Depending on whether the key point could be assigned to the background model in the second step, the key point is marked as the background or the foreground. After the model adaptation was performed for each corner point in the current image, the count of all entries of the model is reduced. If the count drops to zero for an entry, the entry is removed from the model. This will ensure that old entries are replaced by newer entries, for example, after discovering a new background. When searching for a matching entry to a key point model, not only the positions of the corner points are examined, but a small area around this point. One advantage of extending the search to a small area is the robustness of the model to small displacements of the corner points in the image.

If a corner point of the background shifts a few pixels with minimal lighting changes, with camera motion or with vibration due to wind, it can still be assigned to the correct model entry.

To get the best possible model of the background, as particularly FIG. 2 and FIG. 3 show, a limitation of the standard deviation (see ESA) as well making use of time correlation (see EZK) and local correlation (see EÖK) was integrated in the inventive GMM method.

By unfavorable constellations between the model and the video sequence, it may happen that the standard deviation of a Gaussian function, which models the foreground, becomes a very large value. This is especially the case if the color of a pixel is significantly different from the mean of the associated Gaussian function, and during the updating of the model large values of $\|X-\mu_{k,t}\|$ occurs. The larger $\sigma_k$ is, the more color values of the same Gaussian function can be assigned.

Figure 10:
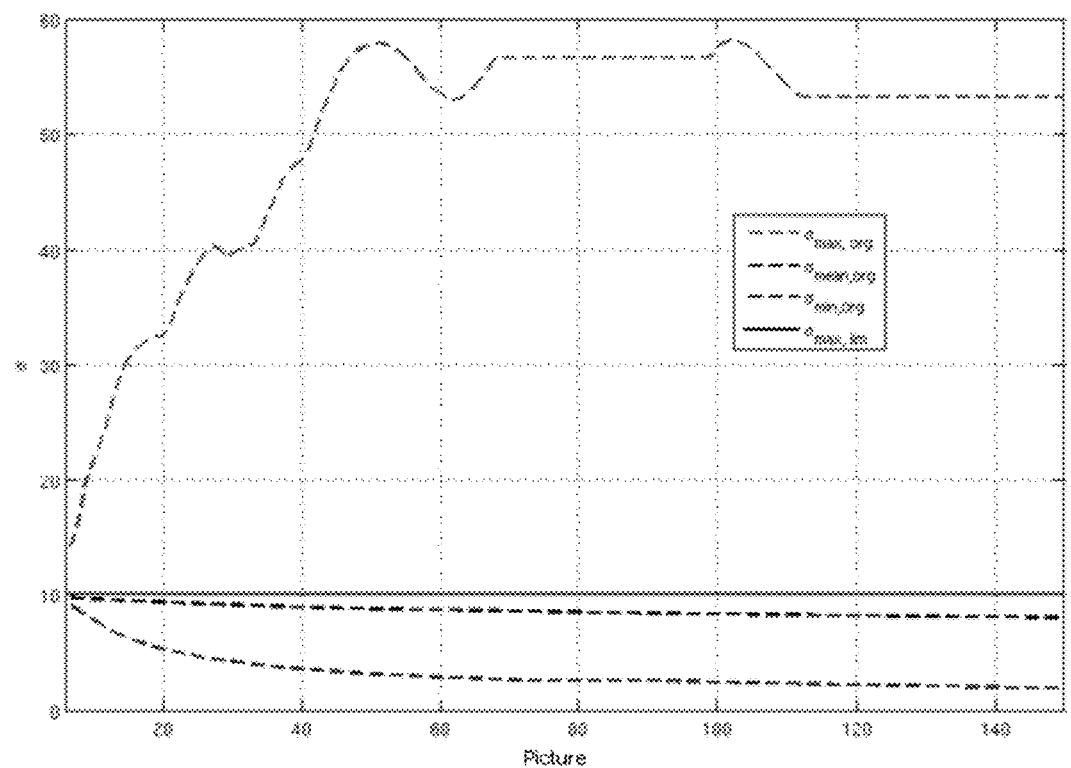

This in turn increases the probability that there are large values for $\|X-\mu_{k,t}\|$. FIG. 10 shows the course of the standard deviation illustrated over time for the first 150 frames of the video sequence road with a resolution of 480×270 pixels.

The parameters of the GMM procedure were set to K=3, T=0.7, α=0.01 and d=2.5. FIG. 10 shows the minimum, average and maximum standard deviation of all Gaussian distributions of all pixels (dashed lines). The maximum standard deviation increases with time and reaches very high values. Therefore, all pixels that no other Gaussian function can be assigned to are assigned to this Gaussian function with a large σ-value. This increases the probability of occurrence and the distribution of k is classified as a background Gaussian function. This leads on to the fact that colors of the foreground will be identified incorrectly as background color.

To solve this problem, a limitation of the standard deviation on the initial value $\sigma_0$ was made; see the straight line parallel to the image axis in FIG. 10.

A limitation of the standard deviation prevents or reduces the event that the foreground features are detected erroneously as background characteristics.

Figure 11:
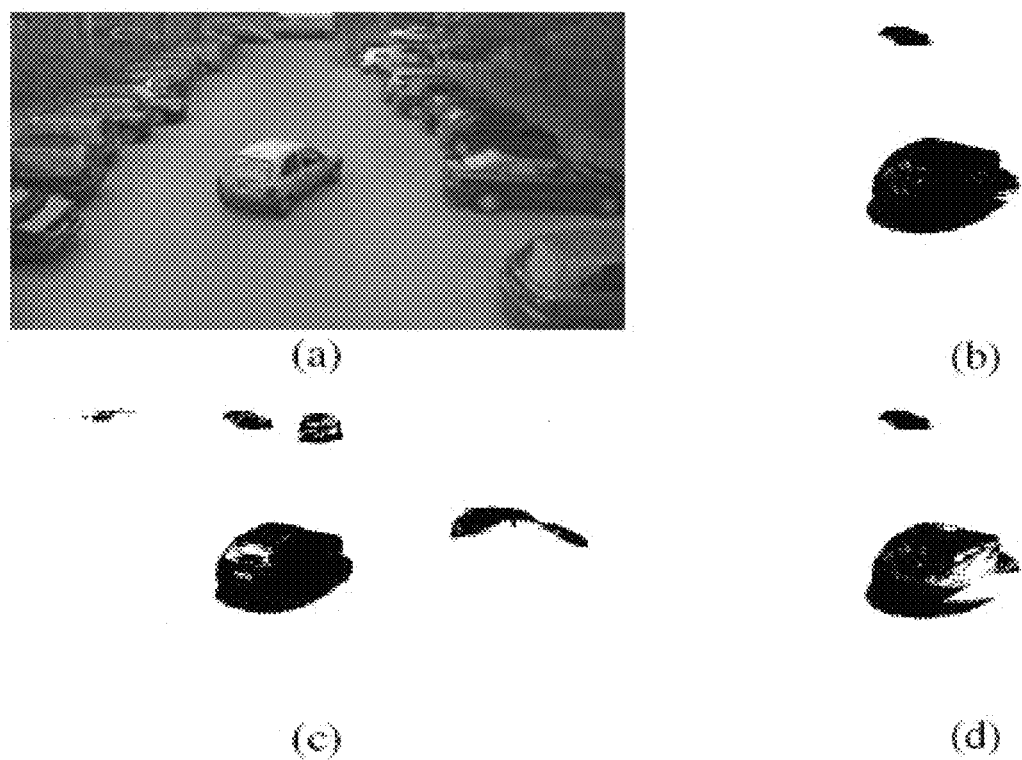

As extensive experiments have shown, the choice of the parameter a is of great importance, since it has great influence on the performance of the detection algorithm, as shown in FIG. 11 for a video sequence: parking lot in the bottom row. On the one hand, a can be chosen as large as possible to adapt the model to changes in the image content. On the other hand, short-term changes should not affect the model therefore a should be chosen as small as possible.

In the standard method, only the average temporal frequency of the color values is taken into account in the sequence. The more frequently, a relevant image point has a specific color value, the greater the probability of occurrence of the corresponding Gauss function is. The direct temporal correlation of the color values is not considered.

Therefore according to the invention is proposed a simple scheme to detect the static background areas and to improve the adaptation of the model in these areas.

For this purpose, the method is extended to the parameter c, which acts as a counter of consecutive mappings of an image point to a particular Gauss function:

$$c_t = \begin{cases} c_{t-1} + 1, & \text{if } k_t = k_{t-1} \\ 0 & \text{else} \end{cases} \quad (11)$$

wherein $k_{t-1}$ denotes the distribution to which the pixel color value in the previous image is assigned, and $k_t$ represents the current assigned Gaussian function.

If the count c exceeds a threshold value $c_{min}$ the factor α is multiplied with a constant s>1.

$$\alpha_t = \begin{cases} \alpha_0 \cdot s, & \text{falls } c_t > c_{min} \\ \alpha_0 & \text{sonst} \end{cases} \quad (12)$$

The factor $\alpha_t$ is now a function of time and $\alpha_o$ corresponds to the value specified by the user. In image areas with static image content, thus the model adjusts more quickly to the background. Since the method is independent of the parameters σ and ω the function is guaranteed in uncovered areas of the picture.

In the top row of FIG. 11, the original image of the sequence: parking lot and the corresponding background are shown, which was calculated with the extended temporal correlation GMM method ($\alpha_0=0.001$, s=10 and $c_{min}=15$). The recognition results of the standard method using $\alpha=0.001$ and $\alpha=0.01$ are illustrated in the lower row of FIG. 11. While the standard method detects either too many or too few image regions as foreground, the method according to the invention provides good binary masks taking into account the temporal correlation.

For all experiments, the parameters were set to K=3, T=0.7, $\alpha=0.01$ and d=2.5.

The GMM standard method treats each pixel separately. Local correlations between adjacent pixels are not taken into account. This leads to false positive detections caused by noise-induced excess of $d \cdot \sigma_{k,\,t-1}$ in equation (4) or caused by small changes in illumination. The pixels due to noise falsely detected as foreground pixels occur in sporadic and not in large, contiguous areas of the image, while false positive detections caused by illumination changes covers often larger contiguous areas of, as they often occur at the edges of the shadow, called the penumbra. By paying attention to the local correlation, both types of false positive detections can be avoided.

According to the invention a very simple method to account for local correlations consists in the application of morphological operations on the binary mask in a post-processing step. Since the morphological operations is applied to a binary mask, all pixels flow with the same weight in these operations. To reduce the false positive detections preferably a weighted decision is made with a weight for the reliability of the allocation instead of a fixed decision. Therefore, an example for a corresponding weight is presented, with which the image points (according to the reliability weighted) can be treated.

Since in the case of a false-positive detection, the color value X of a pixel x lies in the vicinity of the mean value of one of the B background Gaussian functions, for at least one Gaussian distribution $k \in [1 \ldots B]$ a small value for $\|X_t - \mu_{k,t}\|$ is obtained. For actual foreground pixels this is, in general, not the case.

Now, instead of a binary mask, a mask M is generated, which assigns each foreground pixel a weight. For each pixel his weighted mask value will be calculated as follows:

$$M(x, y) = \begin{cases} 0, & \text{if } k(x, y) \in [1 \ldots B] \\ \min_{k=[1 \ldots B]} (\|X_t - \mu_{k,t}\|) & \text{else} \end{cases} \quad (13)$$

Background pixels will continue to be weighted with zero while foreground pixels will be weighted by the minimum of the distances to the average values of the background Gaussian functions. Thus foreground pixels are more heavily weighted, the more they differ from all of the background Gaussian functions. For using the local correlation, similar to T. Aach, A. Kaup, and R. Mester, "Statistical model-based change detection in moving video", Signal Processing, vol. 31, no 2, pp. 165-180, 1993, or in T. Aach and A. Kaup, "Bayesian algorithms for change detection in image sequences using Markov random fields", Signal Processing: Image Communication, vol. 7, no 2, pp. 147-160, 1995 there is proposed to sum the weights within a square window W around the current pixel. This summation may also be similar to a median filtering. By a subsequent thresholding with threshold $M_{min}$ the number of false-positive detections can be reduced and a binary mask $M_B$ based on the mask weighted M can be determined as follows:

$$M_B(x, y) = \begin{cases} 1, & \text{if } \sum_W M(x, y) > M_{min} \\ 0 & \text{else} \end{cases} \quad (14)$$

Figure 12:
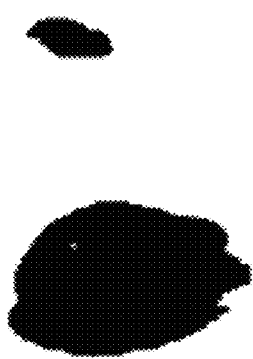

FIG. 12 shows a binary mask BM of the video sequence: parking lot that was generated by a GMM method, which works with spatial and temporal correlation.

The parameters for the local correlation were placed on $M_{min}=980$ and $W=7 \times 7$.

As taking into account that the temporal correlations ensures a faster identification of static image regions as a background, considering local correlations reduces the number of falsely as foreground detected pixels that are caused by noise or lighting changes.

By subtracting the current background model from the current frame, changing image regions are detected. Subsequent from the difference between the background and the current picture and by thresholding a binary mask will be determined that contains the moving image regions. Due to the expansion of the GMM procedure, the quality of the mask is pretty good. By a modified method for shadow removal, image quality may be improved even further.

Although the consideration of the local correlation can reduce the false detection of penumbra pixel, still more too many shadow pixels are detected as foreground objects. Above all the core shadow, called umbra, is still recognized as a foreground object. Therefore, the above-described recognition method is combined with a method for shadow removal, which is described in F. Porikli and O. Tuzel, "Human body tracking by adaptive background models and mean-shift analysis", in Proc. IEEE International Workshop on Performance Evaluation of Tracking and Surveillance, 2003. Since a shadow affects only the saturation and brightness of a color, but has no influence on the hue, shadow pixels may be detected as follows:

The change in luminance is calculated in the RGB color space by projection of the color vector X on the background color vector U:

$$h = \frac{\langle X, U \rangle}{|U|} \quad (15)$$

To measure the luminance between U and X, the ratio $r=|U|/h$ is defined. The angle $\phi=\arccos(h/X)$ between color vector X and background color vector U measures the deviation of the color saturation of the current pixel from the background.

Each foreground pixel is classified as a shadow pixel if it satisfies the following two conditions:

$$r_1 < r < r_2 \text{ und } \phi < \phi_1 \quad (16)$$

where $r_1$ denotes the lowest allowed brightness, $r_2$ the largest allowed brightness and $\phi_1$ the maximum allowable angle. As the umbra pixels are darker than the penumbra pixel, the above conditions cannot be met simultaneously for umbra and penumbra. Therefore, the method for removal of the shadow is divided, so that the values for $r_1$, $r_2$ and $\phi_1$ corresponding to the removal of umbra and penumbra can be set. The division into umbra removal and penumbra removal means that in the $\phi$-r-plane the recognized shadow is shown by two rectangles; see FIG. 6a.

As is evident from the above explanations, a shadow has generally no influence on the hue, but affects only saturation and brightness of a color. Thus, a pixel can be classified by reference to its color value as a shadow if this falls not beyond a lower threshold of maximum allowed darkness ($r_1$) and does not exceed an upper threshold of maximum allowed brightness ($r_2$) and the saturation does not deviate too much from the saturation of the background color of the model ($\phi_1$). In the known method, the detection of the umbra and the penumbra are performed separately. That is, three parameters must be set twice and according to the terms $$r_1 < r < r_2 \text{ und } \phi < \phi_1 \tag{16}$$

must be decided whether a pixel is classified as shadow pixels and thus as a pixel of the background or not.

Figure 6A:
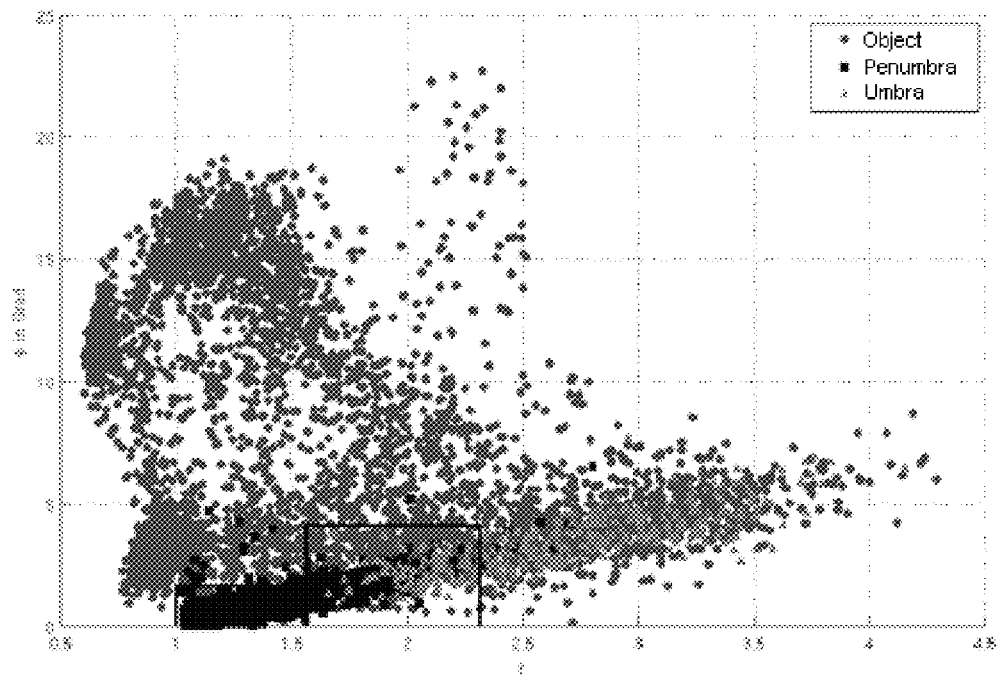

In FIG. 6a the recognition of the umbra and the penumbra in the $\phi$-r-plane is labeled by the two marked rectangles. The separate removal of umbra and the penumbra does improve the quality of the shadow removal, but requires three additional parameters. By introducing a further parameter $\phi_2$, the second portion of the above equation may be replaced by the following:

$$\phi < (\phi_2 - \phi_1)/(r_2 - r_1)*(r - r_1) + \phi_1 \tag{17}$$

Figure 6B:
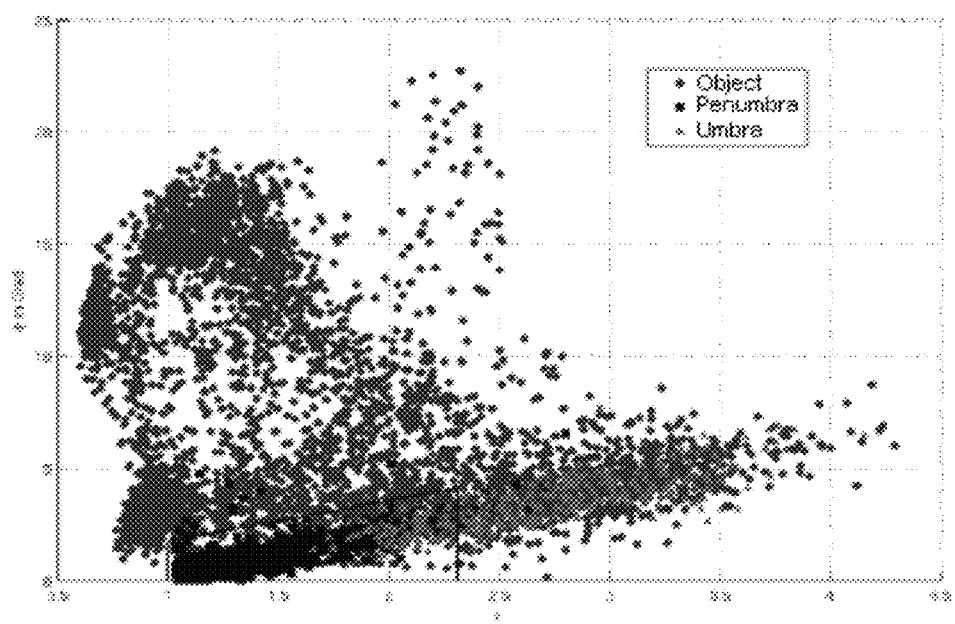

By the fact that according to the invention the further angle $\phi_2$ was introduced and the equation (16) was replaced by the equation (17), in the $\phi$-r-plane the detected shadow is described through a wedge-shaped surface (FIG. 6b). Thus, umbra and penumbra are removed simultaneously in a single rather than two steps and instead of three only one parameter is added to the original shade removal.

To demonstrate the effectiveness of the proposed shadow removal, both advanced methods for shadow removal were applied to the results. In the two-step method, the following parameters $r_1$=I, $r_2$=1.6 and $\phi_1$=2 for the removal of the penumbra were chosen, while the parameters for the removal of the umbra were set to $r_1$=1.6, $r_2$=2.3 and $\phi_1$=4. The one-step method was made with the parameters $r_1$=I, $r_2$=2.3, $\phi_1$=I and $\phi_2$=4.

Figure 13:
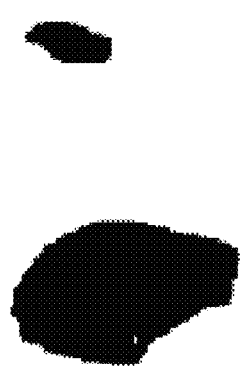

The final binary mask for the video sequence: parking lot delivering by the inventive GMM method with all the presented enlargements shows FIG. 13. This allows the simultaneous removal of umbra and penumbra with only four parameters. The shadow area as identified by the modified process is marked in FIG. 6b by the trapezium.

Following the removal of shadow the binary mask is subjected to a so-called Connected Component analysis to determine contiguous object regions. If there are recognized areas in successive images, they are considered to be reliable identified object. If this objects reliably be detected are not already been prosecuted, than the actual object tracking starts; as shown in FIG. 4. Traditional mean-shift tracking filter uses a symmetric key. However, a symmetrical filter core does not describe the shape of an object with great precision. As the use of symmetric filter kernels influences the color information of the background, this can lead to errors in tracking objects and errors can never be entirely avoided. To overcome the difficulties caused thereby, according to the invention asymmetric and anisotropic filter cores are used. On the current binary mask for reliably recognize objects based a asymmetric filter kernel is created, which describes the shape of the object to the best.

Since the mean-shift method cannot initialize its own, it is either dependent to user input or preferably to the results of a previous object recognition by A. Elgammal, D. Harwood, L. Davis, "Nonparametric Model for Background Subtraction" in Proc. of the 6th European Conference on Computer Vision, June/July 2000, pp. 751-767, which provides a binary mask of the detected object. The asymmetric filter kernel is generated by calculating for each pixel within the mask the normalized distance to the object boundary. During the creation of the target model now a histogram of the object characters is weighted with the asymmetric filter kernel. In detail, based on a binary mask or an object mask, an asymmetric filter core is constructed whereby for each pixel $x_i$=(x, y) within the object surface, the normalized distance to the object boundary is determined as follows:

$$K(x_i) = x_{i\_}\text{distance\_from\_boundary/max\_distance\_from\_boundary} \tag{18}$$

where the distance to the object boundary is determined by morphological operations. To scale the size of the filter core using the Mean-Shift-Iteration, preferably the search area is expanded to include a scaling dimension. The algorithm then operates instead in the spatial domain in this extended search area $\Omega$=(x, y, $\sigma$), which from the image coordinates (x, y) and the scaling dimension $\sigma$ is given. Thus, changes in the object position and object size can be determined simultaneously by the mean-shift iterations.

On condition that an object or the object outline can be described by a closed curve, the image coordinates $x_i$ of an object pixels, are mapped using a simple transformation to a scaling space:

$$\sigma_i = \frac{\delta(x_i)}{r(\theta_i)} = \frac{\|x_i - \hat{x}\|}{r(\theta_i)} \tag{19}$$

where $\delta(x_i)$ denotes the distance between an object pixel $x_i$ and the object focal point $\hat{x}$, $r(\theta_i)$ describes the width of the filter core at angles $\theta_i$ and $\sigma_i$ represents the scaling of the object pixel.

An important feature in carrying out the Mean-Shift-Iterations in the expanded search area (also called spatial-scale-space) is that the sums of the scaling values on both sides of the scaling means value are equal:

$$\sigma_i = \int_0^{2\pi} \int_0^{\tilde{\sigma} r(\alpha)} \frac{\delta}{r(\alpha)} d\delta d\alpha = \int_0^{2\pi} \int_{\tilde{\sigma} r(\alpha)}^{r(\alpha)} \frac{\delta}{r(\alpha)} d\delta d\alpha \tag{20}$$

By integration we obtain $2\tilde{\sigma}^2 - 1 = 0$. Then this equation is obtained by transforming the scale averaging $$\hat{\sigma} = \frac{1}{\sqrt{2}}.$$

The scale mean is a constant and thus independent of the object shape. The mean-shift iterations are then used to update the scaling value. The new scale value is determined here by $\tilde{\sigma} + \Delta\sigma$.

To use the updated scaling value, a further connection between scaling and width of the filter core must be. In: A. Yilmaz, "Object Tracking by asymmetry kernel Mean Shift with Automatic Scale and Orientation Selection" in Proc. IEEE Conference on Computer Vision and Pattern Recognition, June 2007, pp. 1-6, the correlation is defined about a factor $d = 1 + \sqrt{(2)}\Delta\sigma$. This factor is used to calculate the new window width $r_{new}(\alpha) = dr(\alpha)$.

Then the algorithm for actual object tracking with the formed target model is initialized. In order to carry out the mean-shift iterations in the expanded search area, a three-dimensional filter kernel is defined by the product of object-based filter core and a filter core for the scaling dimension:

$$K(x,y,\sigma_i) = K(x,y)K(\sigma). \tag{21}$$

As filter core for scaling dimension a one-dimensional Epanechnikov filter core is used, this is determined by the function $k(z)=1-|z|$ if $|z|<1$ and 0 otherwise with $z=(\sigma_i-\sigma)/h_\sigma]$. The mean-shift vector is now determined in the expanded search area as follows:

$$\Delta\Omega = \frac{\Sigma_i K(\Omega_i - \hat{\Omega})\omega(x_i)(\Omega_i - \hat{\Omega})}{\Sigma_i K(\Omega_i - \hat{\Omega})\omega(x_i)} \tag{22}$$

with $\Delta\Omega=(\Delta x, \Delta y, \Delta\sigma)$. Starting from the object mask of the first image the object focal point and the target model are calculated. To make the model more robust target, in addition, the histogram of the adjacent background is determined. Colors in both the histogram of the target model and the histogram of the object appear to be neighbors, then put in the histogram of the target model to zero. Thus, the influence of object colors that are to the adjacent background very similar is avoided. Since an object may mask does not exactly describe the actual object shape, it can happen that a lot of color information in the target model can be suppressed, if the background adjacent to the object would go directly to the background histogram. To prevent this, the colors of the immediately adjacent background are not considered.

Based on the color distribution $\{q_u(\hat{x})\}_{u=1\ldots m}$ of the target model at position $\tilde{x}$ at image n the algorithm iterates as follows:

First: Initialize the position of the candidate model in image n+1 with $\hat{x}_0=\tilde{x}$ and set $d_0=1$ Second: Compute successively the color distribution $$p(\hat{x}_0) = \{p_u(\hat{x}_0)\}_{u=1\ldots m}$$

and $$\rho[p(\hat{x}_0), q(\hat{x})] = \sum_{u=1}^{m} \sqrt{\hat{p}_u(\hat{x}_0)\hat{q}_u(\hat{x})}.$$

Third: Calculate the weight of $\omega(x_i)$ according to Equation (4).

$4^{th}$: Calculated using the mean-shift vector Equation (11)
The new position of the candidate model $\hat{x}_1=\tilde{x}_0+\Delta x$
factor $d_1=d_0(1+\sqrt{(2)}\Delta\sigma$
$\{p_u(\tilde{x}_1)_{u=1\ldots m}\}$
$\rho[p(\hat{x}_1), q(\hat{x})]$.

$5^{th}$: If $\|\tilde{x}_1-\tilde{x}_0\|<\epsilon$ stop, otherwise $\tilde{x}_0 \leftarrow \tilde{x}_1$, $d_0 \leftarrow d_x$ and go to step 2.

The algorithm uses the mean-shift vector in step 4, to maximize the Bhattacharya coefficients. The threshold value $\epsilon$ in step 5 serves as a stopping criterion. This threshold implies that the vectors $\hat{x}_0$ and $\hat{x}_1$ points to the same image and same image point coordinates. Thus the algorithm terminates either when the same or a smaller value for the Bhattacharya coefficient was determined, or if the candidate model does not changes in two successive images its position.

After the mean-shift iterations are converged starting from the scaled object form the final shape of the object is determined. Therefore the image of color segmentation is subjected. The segmentation is carried out according to D. Comaniciu, P sea, "Mean Shift: A Robust Approach Toward Feature Space Analysis," IEEE Transactions on Pattern Analysis and Machine Intelligence, vol. 24, pp. 603-619, May 2002, also using the mean-shift procedure. For each segment, and within the immediate vicinity of the object must now decide whether it belongs to the object or the background.

All segments that are completely contained in the object area will be classified as an object segments. Also all the segments, the color information preferably at least 50% target in the current model are included, are categorized as object segments.

Possible object segments, which are preferably to about 50% are included in the commercial sector, however, contain a lot of color information, which was eliminated from the target model, are among those decisions is not considered or incorrectly classified as background. In order to prevent that these segments may be lost, a further geometrical condition is applied. Thus, segments that are contained preferably more than 50% in the initial object region, also classified as an object segments.

For example, three different types of object segments are used: blue segments are segments that are completely contained within the object area, yellow segments are segments that are at least 50% are included in the current target model and green segments are segments that are at least 50% in the object area. Segments of the background are shown in red. The final shape of the object is now determined by the outline of all object segments and mapped on the object to be tracked.

Starting from the final shape of the object now, the next object is determined based filter core and then the mean-shift iterations for the next following image are initialized and started.

The advantage of an asymmetric and adapted to the object shape matched filter core is that no color information of the immediately to the object adjacent background is incoming in the histogram formation and so wrongly is taken into account by mean-shift tracking, as is the case in the conventional mean-shift method. Thus, the inventive object tracking is robust and a first important requirement for a pursuit of the object shape is also satisfied, since the tracking algorithm receives during initialization information about the object shape.

In contrast to traditional mean-shift tracking the mean-shift procedure of the methods according to the invention, such as per se is explained in the conference article "Object Tracking by asymmetry kernel Mean Shift with Automatic Scale and Orientation Selection" by A. Yilmaz, in Proc. IEEE Conference on Computer Vision and Pattern Recognition, June 2007, pp. 1-6, carried out in a to a scaling dimension extended search area. In a first size adjustment of the asymmetric filter kernel to the actual object shape is achieved. To adapt the scaled object form of the actual shape of the object as accurately as possible, for example, additionally a mean-shift based color segmentation of the object area and its immediate surroundings is made. Subsequently, the individual segments on the basis of two decision criteria, namely object area or non-object area are categorized.

In this way, the object shape can be better adapted than this would be possible by the procedures or affine transformations described in the contribution in the conference "Object Tracking by asymmetry kernel Mean Shift with Automatic Scale and Orientation Selection" by A. Yilmaz, in Proc. IEEE Conference on Computer Vision and Pattern Recognition, June 2007, pp. 1-6.

Figure 7:
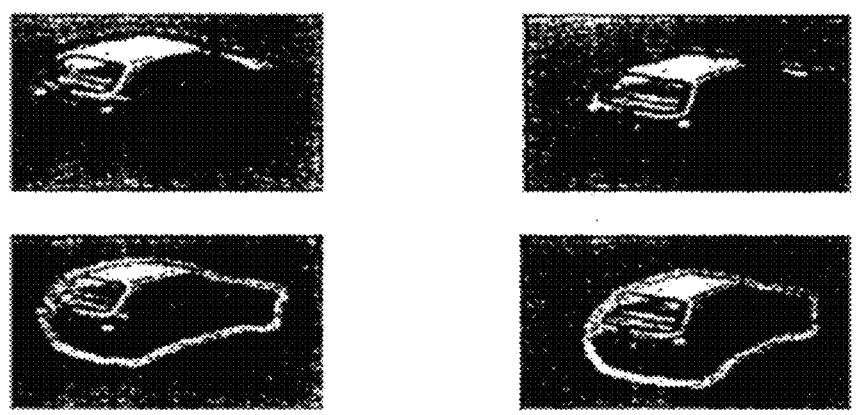

FIG. 7 shows the results of a tracking method according to the prior art, in which the size and orientation of the object shape can be determined only in 2D, (top) and the results of the inventive form-adaptive object tracking (below). The inventive method is thus capable of not only the object's position, but also the shape of the object or its outline, even to determine in the case of so-called out-of-plane rotations.

Figure 8:
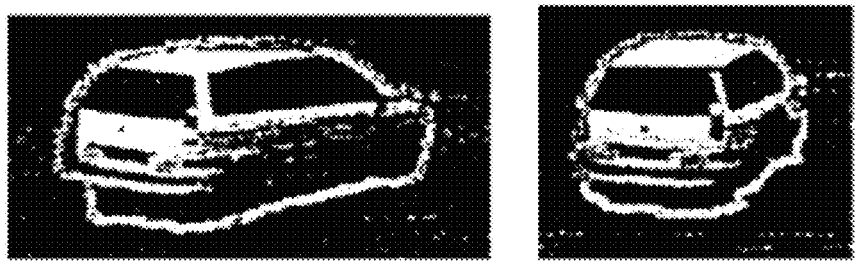
Figure 9:
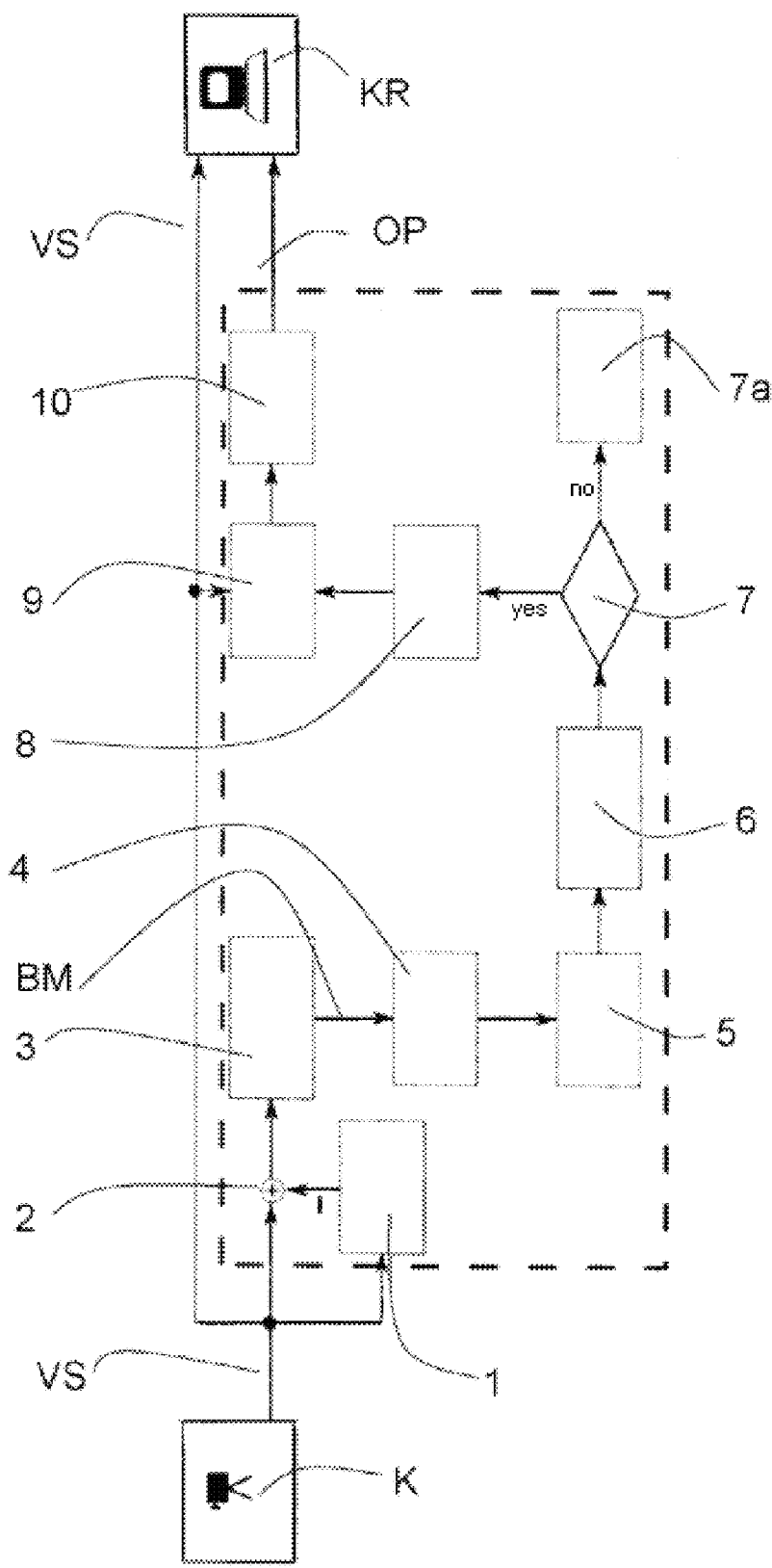

FIG. 8 shows the results of the proposed method compared to the results of the traditional mean-shift tracking whereas the traditional mean-shift tracking is shown in red and the inventive shape-adaptive object tracking is shown in green.

After the first object mask is determined by a motion detection algorithm, the object focal point and the mask-based asymmetric filter core are calculated. The mask-based filter core is then used to determine the weighted histogram in the RGB space. The color values of each color channel are thereby mapped to 32 histogram values so as to have a total of 32×32×32 histogram values. For the scaling dimension a Epanechnikov filter core having a window width of ha=0.4 is used. For the mean-shift segmentation a multivariate filter kernel according to equation (35) in C. Stauffer and WEL Grimson, "Adaptive background mixture models for real-time tracking" in Proc. IEEE Computer Society Conference on Computer Vision and Pattern Recognition, vol. 2, 1999, from the product of two Epanechnikov filter kernels, one for the spatial domain (image coordinates) and one for the range of values (color), is generated. The window size for the local Epanechnikov filter kernel is set to hr=4 and the window width for the Epanechnikov filter kernel of the value range is set to hs=5. The minimum segment size was set to 5 pixels.

The proposed algorithm was tested with several video sequences. In FIG. 7 are compared the results of the pre-set shape-adaptive method (green contours) with the results of a mean-shift object tracking, which adjusts only the scale and 2D orientation. At the start of tracking between the two methods any difference is hardly noticeable, but once the car starts to turn, the shape adaptive object tracking provides much better results.

In FIG. 8, the method of the shape-adaptive object tracking is compared with the standard mean-shift tracking, which uses the +−10% method. The standard procedure can only partially determine the position and size of the white vans, while the shape-adaptive object tracking follows both position and shape of the white vans very well. Only because of high color similarity between object color and background color, the shape-adaptive object tracking cannot make a clearly difference between the bonnet of the van and the background.

In order to evaluate the performance of the object tracking in particular, a detection rate RD and a false alarm rate of false detections RFP and a false alarm rate of the unrecognized foreground pixels RPN is calculated and averaged over the respective sequence, i.e.

$R_D$=number of correctly detected foreground pixels: The number of foreground pixels of the reference, $R_{FP}$=number of detected background as foreground pixels: The number of background pixels of the reference, $R_{FN}$=number of undetected foreground pixels: The number of foreground pixels of the reference.

Table 1 shows $R_D$, $R_{FP}$ and $R_{FN}$ of the video sequence: parking lot. All rates were calculated by comparing the result of the object tracking with a manually created reference. $R_D$ is determined as the number of pixels that are detected and also correspond to the true object pixels, therefore lie within the object region of the manually created reference. The false positives are the number of false detections, then the background pixels are falsely detected as foreground pixels. The false negatives are equal to the number of not detected object pixels.

| Videosequence | frames | RD (%) | RFP (%) | RFN (%) |
|---|---|---|---|---|
| Parking Lot | 35 | 98.54 | 8.25 | 1.45 |

The proposed method extends the standard mean-shift algorithm, so that a tracking of the object shape and object size is possible. This is achieved by using an object mask created by an asymmetric filter kernel to track objects in a 3-dimensional search area. Both the object position and the size of the object are updated. To adapt the thus-determined object contour as closely as possible to the actual contour of the object, the mean-shift iterations are followed by a segmentation step. Thus, the object shape is described well also in the case of 3D rotation. Only in the case of large color similarity between the object and adjacent background, the process is reaching its limits and it can lead to errors in the tracking, because if too many colors will be removed from the target object model.

The inventive method and system can be used in future digital video surveillance systems. Especially in the run-up monitoring at airports by the exact shape of the object in two-dimensional video image a determination of the orientation of the object in space can be made, insofar sufficient cartographic data are provided. This will make it possible to automatically detect early false-branch off cars and aircrafts to prevent or correct the misconduct of the driver or the pilot by changing the traffic control.

The invention is not limited to the illustrated and described embodiments, but encompasses all the purposes of the invention, that are functioning in a similar way. Within the scope of the invention in addition to the SIFT (scale-invariant feature transform) features or Mean-Shift-Characteristics also CDOF features or KLT features could be used. Furthermore, the invention is also not yet limited to the combination of features defined in the present claims, but can also be defined by any other combination of specific features of all the individual features disclosed overall.

The invention claimed is:

1. A method for automatic object detection and subsequent object tracking in digital video systems having at least one camera for recording and transmitting video sequences, said method comprising:
   supplying a video signal from the at least one camera to a control room;
   supplying the video signal from the at least one camera to each of:
   an object detection module; and
   an object tracking module;
   processing the video signal in the object detection module using an algorithm based on a Gaussian mixture model to detect one or more objects in the video sequence;
   processing the video signal in the object tracking using Mean-Shift analysis to track one or more objects in the video sequence,
   further processing the video signal in the object detection module using background modeling to improve the removal of shadows from the one or more objects detected in the video sequence,
   generating a binary mask at an output of the object detection module that determines whether a newly identified object is present in the video sequence and creates an asymmetric filter core,
   supplying an output of the binary mask to the object tracking module, and
   initializing an object detection algorithm for shape-adaptive object tracking in the object tracking module, wherein the object detection algorithm for shape adaptive object tracking further comprises a segmentation step that comprises:
adapting a localized object region as closely as possible to actual object shape,
making a color segmentation or a Mean shift based color segmentation of the object and its immediate object region,
classifying as object segments all segments that fall at least 35% to 70% within the immediate object region, and
categorizing as object segments all segments whose color information falls at least to 35% to 70% within a target model, such that a determination of at least one of object shape or object contour or orientation of the object in space is made, and
supplying an output of the object tracking module to the control room with the video signal supplied by the at least one camera.

2. The method according to claim 1, wherein, during the initializing step, information about a contour of the object is obtained using the asymmetric filter core and the mean shift algorithm using only an actual object characteristic selected from the group consisting of color, edges and structure information.

3. The method according to claim 2, wherein the selected actual object characteristic or Scale invariant feature transform (SIFT) feature is considered in the asymmetric filter core of the binary mask, and wherein the method further comprises integrating, using a GMM method, a limitation of a standard deviation as well as an exploitation of temporal and spatial correlation in the object detection module.

4. The method according method according to claim 1, wherein changing image regions are detected by subtracting a current background model from a current image of the video sequence, and wherein the binary mask implements a threshold decision from a difference between the background model and the current image.

5. The method according to claim 1, wherein a detection of penumbra and umbra takes place according to the equation $$\phi<(\phi_2-\phi_1)/(r_2-r_1)*(r-r_1)+\phi_1$$

wherein $r_1$ represents a lower threshold of maximum allowed darkness, wherein $r_2$ represents an upper threshold of maximum allowed brightness, wherein r represents a current brightness value, wherein $\phi_1$ represents an angle indicating a minimum allowable deviation of color saturation of a current pixel from background, and wherein $\phi_2$ represents an angle indicating a maximum allowed deviation of color saturation of the current pixel from the background and an angle $\phi$, which measures a current deviation of color saturation of the current pixel from the background, so that a simultaneous removal of penumbra and umbra by only four parameters occurs.

6. The method according to claim 1, further comprising performing a Connected Component Analysis of the binary mask after shadow removal to determine related object regions.

7. The method according to claim 6, wherein, if in several consecutive images areas are recognized, such areas are classified as reliable objects, and wherein an asymmetric filter kernel is generated for the reliable objects based on the current binary mask by calculating a normalized distance to an object boundary for each pixel within the binary mask.

8. A system comprising:
at least one camera for recording a video sequence and transmitting a video signal;
an object detection module that is configured to receive the video signal from the camera and detect one or more objects in the video sequence using a model of a background image that is generated by a Gaussian Mixture Model algorithm and also remove shadows from the background image and generates and outputs a binary mask;
an object tracking module that is configured to receive the video signal from the camera and an output from the binary mask and perform a mean-shift based analysis object tracking in order to output information about object position and object form from the video signal and the binary mask, wherein the tracking means comprises an asymmetric filter core and means for an adaptive object tracking that performs object shape adaptation segmentation; and
a processing/evaluating means, in a control room, that is configured to receive the video signal from the camera, the information about object position and object form and thereby determine the shape of the object or the object contour or the orientation of the object.

9. The system according to claim 8, wherein the object detection module comprises, in series, limitation means for limiting standard deviation, considering means for taking into account temporal correlation, removal means for shadow removal, and considering means for taking into account local correlation, wherein the object detection module is connected to an input of a subtraction circuit, wherein the video signal of the camera is connected to an other input of said subtraction circuit, and wherein the binary mask is formed at an output of said subtraction circuit.

10. The system according to claim 8, wherein the object tracking module comprises a creating means for creating the target model via a histogram, and a generating means for generating the filter core based on the binary mask, and wherein the binary mask is supplied to an input of the means for generating the filter core, and the video signal of the camera is supplied to an input of the means to create the target model via the histogram.

11. The system according to claim 8, wherein the video signal of the camera is supplied both to a means for calculating background and to a means for identifying a difference between objects and background, wherein a second input of the means for identifying the difference is connected to an output of the means for calculating the background, and wherein a means for thresholding is connected at the output of the means for identifying the difference, said means for thresholding comprising in series a means for shadow removal, a means for performing a connected component analysis and a means for comparison of components connected with persecuted objects, and wherein the binary mask is at the output of said comparison means.

12. A non-transitory computer-readable medium encoded with a computer program comprising program code for carrying out all steps of the method according to claim 1 when said program is running on a computer and/or a device comprising:
at least one camera for recording a video sequence and transmitting a video signal;
an object detection module for receiving the video signal from the camera and automatically detecting one or more objects in the video sequence, wherein the object detection module generates and outputs a binary mask, wherein object detection is based on a model of a background image that is generated by Gaussian Mixture Model algorithm, and wherein the object detection module further removes shadows from the background image;

an object tracking module for receiving the video signal the camera and an output from the binary mask, said module being configured to conduct mean-shift based analysis object tracking in order to output information about object position and object form from the video signal and the binary mask, wherein the object tracking module further comprises an asymmetric filter core and means for an adaptive object tracking that performs shape adaptation segmentation; and a processing/evaluating means, in a control room, that is configured to receive the video signal from the camera, the information about object position and object form and thereby determine the shape of the object or the object contour or the orientation of the object.

* * * * *